(12) United States Patent
Palmer (10) Patent No.: US 11,630,784 B2
(45) Date of Patent: Apr. 18, 2023

(54) LOW-COST PHYSICAL TAMPER DETECTION AND RESPONSE FOR CRYPTOGRAPHICALLY SECURE SANITIZATION

(71) Applicant: Raytheon Company, Waltham, MA (US)

(72) Inventor: Nathan T. Palmer, Austin, TX (US)

(73) Assignee: Raytheon Company, Waltham, MA (US)

( * ) Notice: Subject to any disclaimer, the term of this patent is extended or adjusted under 35 U.S.C. 154(b) by 752 days.

(21) Appl. No.: 16/689,362

(22) Filed: Nov. 20, 2019

(65) Prior Publication Data

US 2021/0149823 A1    May 20, 2021

(51) Int. Cl.
| | |
|---|---|
| *G06F 12/14* | (2006.01) |
| *G06F 3/06* | (2006.01) |
| *G06F 21/72* | (2013.01) |
| *G06F 21/80* | (2013.01) |
| *H04L 9/08* | (2006.01) |
| *G06F 21/87* | (2013.01) |

(52) U.S. Cl.
CPC ........ *G06F 12/1408* (2013.01); *G06F 3/0623* (2013.01); *G06F 3/0652* (2013.01); *G06F 3/0673* (2013.01); *G06F 21/72* (2013.01); *G06F 21/80* (2013.01); *G06F 21/87* (2013.01); *H04L 9/0822* (2013.01); *H04L 9/0861* (2013.01); *H04L 9/0897* (2013.01); *G06F 2221/2143* (2013.01)

(58) Field of Classification Search
CPC .. G06F 12/1408; G06F 3/0623; G06F 3/0652; G06F 3/0673; G06F 21/72; G06F 21/80; G06F 21/87; G06F 2221/2143; H04L 9/082; H04L 9/0861; H04L 9/0897
See application file for complete search history.

(56) References Cited

U.S. PATENT DOCUMENTS

| | | | |
|---|---|---|---|
| 8,331,189 B1 * | 12/2012 | Pancoast | G06F 21/79 365/228 |
| 8,499,173 B2 | 7/2013 | Caci | |
| 8,983,073 B1 * | 3/2015 | Peterson | G06F 21/629 713/193 |
| 2004/0066274 A1 | 4/2004 | Bailey | |

(Continued)

*Primary Examiner* — Hee K Song
(74) *Attorney, Agent, or Firm* — Daly, Crowley, Mofford & Durkee, LLP (57) ABSTRACT

An integrated circuit, comprising: a volatile memory module configured to store a cryptographic key; a capacitor array for providing power to the volatile memory module; and a power switching logic arranged to connect and disconnect the memory module from the capacitor array, the power switching logic being configured to operate in at least one of a first operating mode and a second operating mode, wherein, when the power switching logic operates in the first operating mode, the power switching logic is configured to disconnect the capacitor array from the volatile memory module in response to detecting a change of state of a break line, and, when the power switching logic operates in the second operating mode, the power switching logic is configured to disconnect the capacitor array from the volatile memory module in response to detecting that a voltage at a connection terminal of the integrated circuit exceeds a threshold.

19 Claims, 7 Drawing Sheets

(56) References Cited

U.S. PATENT DOCUMENTS

2005/0151777 A1    7/2005  Silverbrook
2012/0185636 A1*   7/2012  Leon .................... H01L 23/576
                                                      711/E12.001
2012/0278906 A1*  11/2012  Pedersen .......... H03K 19/17768
                                                      726/34

* cited by examiner

LOW-COST PHYSICAL TAMPER DETECTION AND RESPONSE FOR CRYPTOGRAPHICALLY SECURE SANITIZATION

BACKGROUND

Protection of computer data is essential to integrity of computer systems. Mitigation of physical tampering to computer systems is difficult to implement on legacy or low-cost computing systems. Many low-cost computing systems could benefit from a solution to the problem of detecting and responding to a tamper event in a way that is hard to bypass and works without the system being powered on.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, an integrated circuit having a plurality of connection terminals, comprising: a volatile memory module configured to store a cryptographic key; a control logic; an encryption block configured to retrieve the cryptographic key from the volatile memory module, and decrypt data that is provided to the encryption block by the control logic; a capacitor array for providing power to the volatile memory module; a power switching logic arranged to connect and disconnect the volatile memory module from the capacitor array, the power switching logic being configured to operate in one of at least a first operating mode, a second operating mode, and a third operating mode, wherein, when the power switching logic operates in the first operating mode, the power switching logic is configured to disconnect the capacitor array from the volatile memory module in response to detecting a change of state of a break line, the break line extending between a pair of first terminals of the integrated circuit, wherein, when the power switching logic operates in the second operating mode, the power switching logic is configured to disconnect the capacitor array from the volatile memory module in response to detecting that a voltage at a second connection terminal of the integrated circuit exceeds a threshold, and wherein, when the power switching logic operates in the third operating mode, the power switching logic is configured to: (i) disconnect the capacitor array from the volatile memory module in response to detecting a change of state of the break line, and (ii) disconnect the capacitor array from the volatile memory module in response to detecting that the voltage at the second connection terminal of the integrated circuit exceeds the threshold.

According to aspects of the disclosure a system is provided, comprising: a memory; an anti-tampering circuit, including: (i) a volatile memory module configured to store a cryptographic key; (ii) a control logic; (iii) a capacitor array for providing power to the volatile memory module; and (iv) a power switching logic arranged to disconnect the capacitor array from the volatile memory module in response to detecting a change of state of a break line, the break line extending between a pair of first terminals of the anti-tampering circuit; and at least one processor that is operatively coupled to the memory and the anti-tampering circuit, wherein the at least one processor is configured to interact with the control logic of the anti-tampering circuit to decrypt data that is stored in the memory, the data being decrypted with the cryptographic key that is stored in the volatile memory module of the anti-tampering circuit.

According to aspects of the disclosure, an integrated circuit is provided, comprising: a volatile memory module configured to store a cryptographic key; a control logic; a capacitor array for providing power to the volatile memory module; a power switching logic arranged to operate in at least a first operating mode, wherein, when the power switching logic operates in the first operating mode, the power switching logic is configured to disconnect the capacitor array from the volatile memory module in response to detecting that a voltage at a connection terminal of the integrated circuit exceeds a threshold.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
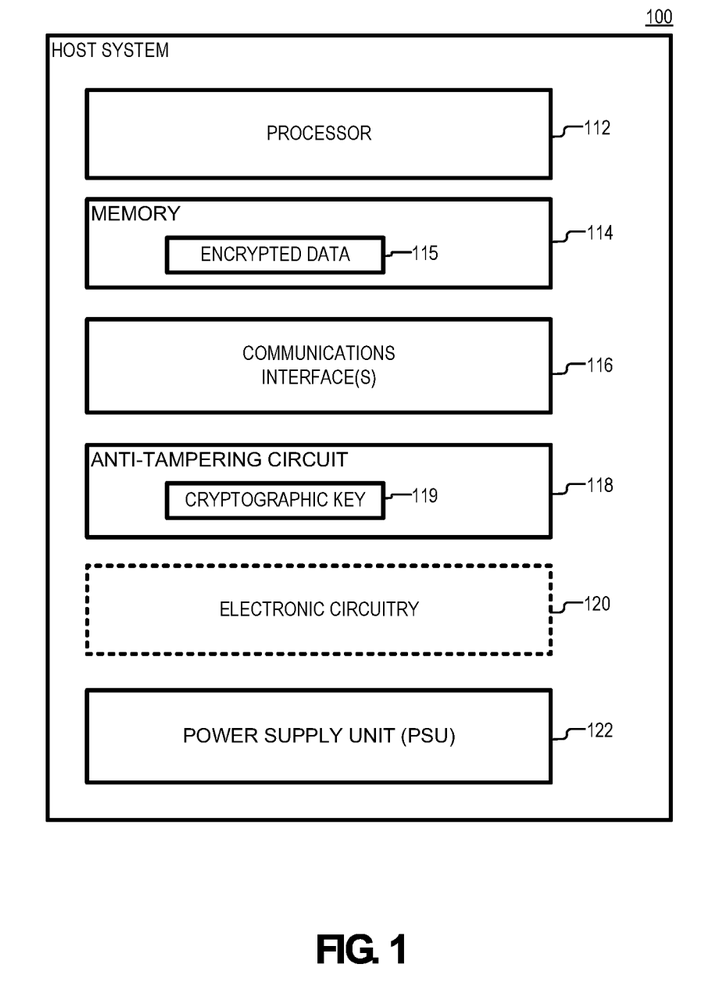
FIG. 1 is a diagram of an example of a host system including an anti-tampering circuit, according to aspects of the disclosure.

FIG. 1 is a schematic diagram of a host system 100, according to aspects of the disclosure. The host system may include a general-purpose computer, a smartphone, and/or any other suitable type of device. Additionally, or alternatively, the host system 100 may include telecommunications equipment, military equipment (e.g., radar equipment), and/or any other suitable type of equipment. Stated succinctly, the present disclosure is not limited to any specific implementation of the host system 100.

As illustrated, the host system 100 may include at least one processor 112 that is operatively coupled to a memory 114, communications interface(s) 116, an anti-tampering circuit 118, a power supply unit 122, and optionally electronic circuitry 120. The processor 112 may include any suitable type of processing circuitry, such as one or more of an integrated circuit (ASIC), a field-programmable gate array (FPGA), and/or a general-purpose processor (e.g., an ARM-based processor, etc.). The memory 114 may include any suitable type of volatile and/or non-volatile memory. For example, in some implementations, the memory 114 may include one or more of random-access memory (RAM), a read-only memory (ROM), a solid-state drive (SSD), electrically erasable programmable read-only memory (EEPROM), and/or any other suitable type of memory. The communications interface(s) 116 may include a Bluetooth interface, a WiFi interface, a ZigBee interface, a Universal Serial Bus (USB) interface and/or any other suitable type of interface. The electronic circuitry 120, may include any suitable type of electronic circuitry, such as one or more of signal processing circuitry, satellite communications circuitry, etc. The power supply unit 122 may include an ATX power supply, and/or any other suitable type of power supply unit.

In some implementations, the anti-tampering circuit 118 may be implemented as a smart card, which is inserted in a smart card slot (not shown) that is provided in the host system 100. Additionally, or alternatively, in some implementations, the anti-tampering circuit 118 may be implemented as a chip that is soldered directly on a motherboard (not shown) of the host system 100. Stated succinctly, the present disclosure is not limited to any specific implementation of the anti-tampering circuit 118.

The anti-tampering circuit 118 may be operatively coupled to the processor 112 via any suitable type of interface, such as a USB interface, a serial interface, an I2C interface, etc. The anti-tampering circuit 118 may be configured to store a cryptographic key 119, as shown. Furthermore, the anti-tampering circuit 118 may be configured to delete the cryptographic key 119 when one or more tampering events are detected by the anti-tampering circuit 118. Such events may include a physical tampering event and/or an electronic tampering event. As is discussed further below, a physical tampering event may occur when the physical integrity of the packaging of the anti-tampering circuit 118 or the physical integrity of the enclosure of the host system 100 are violated. By contrast, an electronic tampering event may occur when a malicious party connects a signal analyzer or another type of signal probe to one or more connectors of the anti-tampering circuit 118, in an attempt to break into the anti-tampering circuit 118 and retrieve the cryptographic key 119 from the anti-tampering circuit 118.

In some implementations, the memory 114 may include volatile memory (e.g., DRAM, etc.), and it may be configured to store encrypted data 115. The encrypted data 115 may be generated by encrypting production data with the cryptographic key 119. The term "production data", as used throughout the disclosure, may include any data that is generated (or retrieved from non-volatile memory) during the operation of the processor 112. As is further discussed below, encrypting the production data with the cryptographic key 119 to produce the encrypted data 115 may increase the security of the host system 100. In instances in which the host system 100 includes military equipment, the production data may include any suitable type of sensitive data that is desired to be protected from third-party access.

In some implementations, the cryptographic key 119 may remain stored exclusively in the anti-tampering circuit. In such implementations, the cryptographic key 119 may never leave the anti-tampering circuit 118, and it may never be copied into another memory device within the host system 100. When the cryptographic key 19 is deleted (by the anti-tampering circuit 118), in response to a tampering event, the encrypted data 115 may become unrecoverable or inaccessible. In other words, deleting the cryptographic key 119 from the anti-tampering circuit 118 may result in the host system 100 being cryptographically sanitized. According to the present disclosure, a system is cryptographically sanitized when sensitive data remains stored in the system in encrypted form, while the key for decrypting the sensitive data is destroyed. This is in contrast to many conventional systems which delete sensitive data, rather than cryptographically sanitizing it, when a tampering event is detected.

Additionally, or alternatively, in some implementations, the memory 114 may include a non-volatile memory, and the encrypted data 115 may include boot data. As used throughout the disclosure, the term "boot data" may refer to any type of data that is needed for booting the host system 100, and without which, the host system 100 cannot be booted. When the encrypted data 115 includes boot data, the processor 112 may need to decrypt the boot data in order for the host system 100 to start successfully. In such implementations, deleting the cryptographic key 119 from the anti-tampering circuit 118 may prevent the processor 112 from decrypting the encrypted data 115, thereby causing the host system 100 to become disabled.

Figure 2:
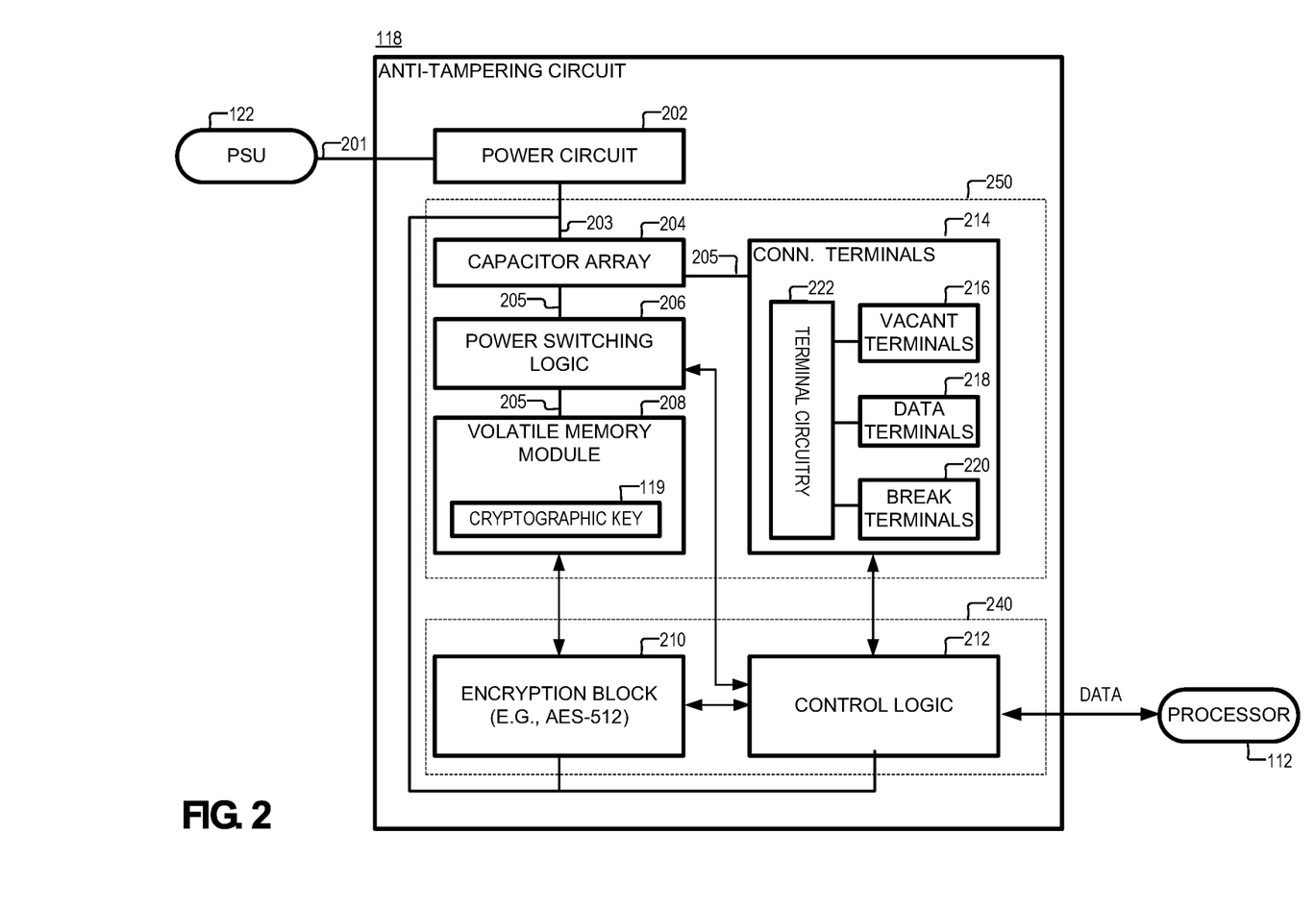
FIG. 2 is a diagram of an anti-tampering circuit, according to aspects of the disclosure.

FIG. 2 shows the anti-tampering circuit 118 in further detail. As illustrated, the anti-tampering circuit may include a power circuit 202, a capacitor array 204, a power switching logic 206, a volatile memory module 208, an encryption block 210, control logic 212, and connection terminals 214.

The power circuit 202 may include a voltage regulator, and/or any other circuit for conditioning power that is supplied to the anti-tampering circuit 118 by the power supply unit 122. The capacitor array 204 may include an array of high-capacity capacitors that are configured to supply power to the volatile memory module 208 when the external power source is unavailable (e.g., when the host system is powered off, etc.). The power switching logic 206 may include any suitable type of electronic circuitry for connecting and disconnecting the volatile memory module 208 from the capacitor array 204. The encryption block 210 may include any suitable type of electronic circuitry for encrypting and decrypting data (e.g., an AES-512 encryption block, etc.). The control logic 212 may include any suitable type of electronic circuitry that is configured to interact with the processor 112 to encrypt and decrypt data that is provided by the processor 112. In some implementations, the control logic 212 may include a communications interface, such as an I2C interface, for transmitting and receiving data from the processor 112. As can be readily appreciated, the communications interface may be connected to data terminals 218.

The connection terminals 214 may include connection pins, connection pads, and/or any other suitable type of connection terminal. The connection terminals 214 may include vacant terminals 216, data terminals 218, and break terminals 220. Each of the vacant terminals 216 may include a terminal that is not being used by the anti-tampering circuit to send/receive data or detect physical tampering. For example, the vacant terminals 216 may include terminals that are provided on the anti-tampering circuit as bait to potential attackers, terminals that are not connected to any electronic circuitry, terminals that were used to program the anti-tampering circuit 118, and which are not used during the normal operation of the anti-tampering circuit 118, and/or terminals that are provided on the anti-tampering circuit for any other reason. The data terminals 218 may include terminals that are used for sending and receiving data from the processor 112. The break terminals 220 may include terminals that are used to detect physical tampering with one or more of: (i) packaging of the anti-tampering circuit or (ii) housing of the host system 100. The terminal circuitry 222 may include one or more operational amplifiers, analog filters, and/or any other circuitry that is normally used to condition signals that are received on connection terminals of an integrated circuit before those signals are supplied to processing logic that is part of the integrated circuit.

In operation, the power circuit 202 may receive a power signal 201 from the power supply unit 122, generate a power signal 203 based on the power signal 201, and feed the power signal 203 to the capacitor array 204, the encryption block 210, and the control logic 212. The power signal 203 may be used to charge the capacitor array 204 in a well-known fashion, as well as to power the encryption block 210 and the control logic 212. The capacitor array 204 may be configured to output a signal 205 to the power switching logic 206 and the terminal circuitry 222. The power switching logic 206 may forward the signal 205 to the volatile memory module 208.

The power switching logic 206 may be configured to disconnect the volatile memory module 208 from the capacitor array 204 when a tampering event is detected by the power switching logic. The operation of the power switching logic 206 is discussed further below with respect to FIG. 4.

The volatile memory module 208 may include a static random-access memory (SRAM) module, and/or any other suitable type of memory. In some implementations, the volatile memory module 208 may be selected such that the contents of the volatile memory module 208 (e.g., the cryptographic key 119) is deleted within a certain time (e.g., 500 milliseconds) of the volatile memory module 208 losing its supply of power (e.g., as a result of being disconnected from the capacitor array 204 by the power switching logic 206).

The volatile memory module 208, in some implementations, may be powered solely through the capacitor array 204. In such implementations, when the volatile memory module 208 is disconnected from the capacitor array 204 (by the power switching logic 206), no other supply of power may be available to the volatile memory module 208. Accordingly, when the volatile memory module 208 is disconnected from the capacitor array 204, the contents of the volatile memory module 208 (e.g., the cryptographic key 119) may be deleted. By interrupting (e.g., cutting off) the supply of power from the capacitor array 204 to the volatile memory module 208, the power switching logic 206 may delete the cryptographic key 119. As is discussed further below, the power switching logic 206 may interrupt the supply of power from the capacitor array 204 to the volatile memory module 208 in response to detecting a tampering event.

The encryption block 210 and the control logic 212 may be powered directly by the power circuit, rather than receiving power through the capacitor array 204. When the supply of power to the power circuit 202 (by the power supply unit 122) is cut (e.g., due to the host system 100 being turned off), the encryption block 210 and the control logic 212 may be turned off. By contrast, because the power switching logic 206, the volatile memory module 208, and the terminal circuitry 222 are powered through the capacitor array 204, they may remain operational when the supply of power to the power circuit 202 is cut (for as long as there is charge remaining in the capacitor array 204). As a result of this configuration, in the example of FIG. 2, the encryption block 210 and the control logic 212 may be said to form an external power domain 240 of the anti-tampering circuit 118; while the capacitor array 204, the power switching logic 206, the volatile memory module 208, and the terminal circuitry 214 may be said to form an internal power domain 250 of the anti-tampering circuit 118.

When the host system 100 is powered on, current may flow from the power supply unit 122 to the capacitor array 204, and from the capacitor array 204 to the volatile memory module 208. However, when the host system is powered off, the volatile memory module 208 may be powered with a current that is discharged from the capacitor array 204. In this regard, the capacitor array 204 may provide the volatile memory module 208 with backup power, when the host system 100 is powered off, in order to prevent the cryptographic key 119 from being erased from the volatile memory module 208. In some respects, because the capacitor array 204, the power switching logic 206, the volatile memory module 208, and the terminal circuitry 222 belong to the internal power domain 250, they may remain powered during periods in which the host system is turned off, allowing the power switching logic 206 to detect and respond to any tampering events that might occur while the host system 100 is turned off.

The encryption block 210 may include an AES-512 encryption block and/or any other suitable type of encryption block. The encryption block 210 may be configured to: receive a request to encrypt data from the control logic 212, retrieve the cryptographic key 119 from the volatile memory module 208, encrypt the data to produce encrypted data by using the cryptographic key 119, and provide the encrypted data to the control logic 212. Additionally or alternatively, in some implementations, the encryption block 210 may be configured to: receive a request to decrypt data from the control logic 212, retrieve the cryptographic key 119 from the volatile memory module 208, decrypt the data to produce decrypted data by using the cryptographic key 119, and provide the decrypted data to the control logic 212.

The control logic 212 may include any suitable processing circuitry that is configured to: receive a first request to encrypt data from the processor 112, issue a second request to encrypt the data to the encryption block 210, receive encrypted data from the encryption block 210 in response to the second request, and provide the encrypted data to the processor 112. Additionally, or alternatively, in some implementations, the control logic 212, may include any suitable processing circuitry that is configured to: receive a first request to decrypt data from the processor 112, issue a second request to decrypt the data to the encryption block 210, receive decrypted data from the encryption block 210 in response to the second request, and provide the decrypted data to the processor 112.

Figure 3:
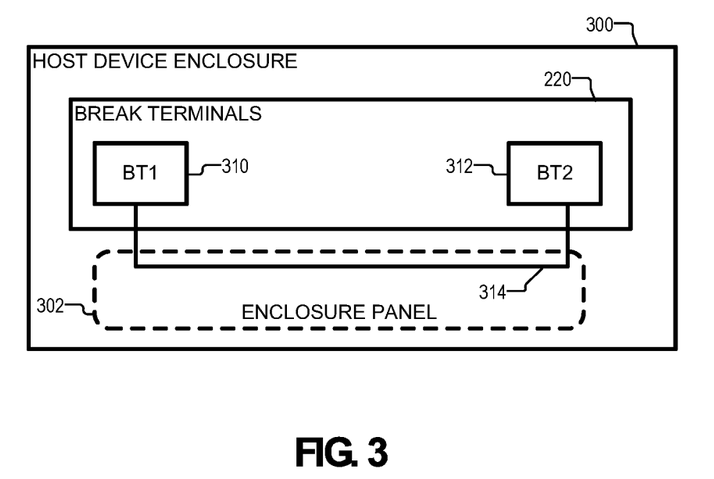
FIG. 3 is a diagram of a device enclosure that is protected with the anti-tampering circuit of FIG. 2, according to aspects of the disclosure.

FIG. 3 illustrates the configuration of the break terminals 220 (of FIG. 2) in further detail. Shown in FIG. 3 is a device enclosure 300 including an enclosure panel 302. The device enclosure 300 may house one or more of the processor 112, the memory 114, the communications interface(s) 116, the anti-tampering circuit 118, the electronic circuitry 120, and the power supply unit 122. The enclosure panel 302 may include any suitable type of removable enclosure panel. In some implementations, removing the enclosure panel 302 may grant physical access to any of the processor 112, the memory 114, the communications interface(s) 116, the anti-tampering circuit 118, the electronic circuitry 120, and the power supply unit 122.

The break terminals 220 may include a first break terminal 310 and a second break terminal 312 that are connected to one another via a break line 314. According to the present example, the break line is arranged to be interrupted (e.g., severed or opened) when the enclosure panel 302 is removed from the device enclosure 300. Although in the example of FIG. 3, the break line 314 is interrupted when the physical integrity of the device enclosure 300 is violated (e.g., permanently or temporarily), alternative implementations are possible in which the break line 314 is arranged to be interrupted when the physical integrity of packaging of the anti-tampering circuit 118 is violated. In such implementations, the break line 314 may be interrupted when the packaging is cut through or otherwise broken in order to gain access to the internal components of the anti-tampering circuit 118.

Figure 4:
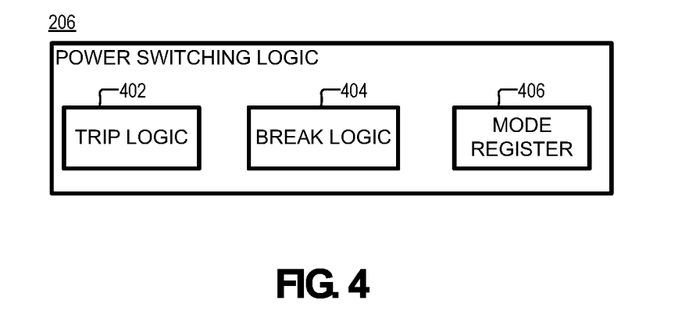
FIG. 4 is a diagram of an example of a power switching logic that is part of the anti-tampering circuit of FIG. 2, according to aspects of the disclosure.

FIG. 4 shows the power switching logic 206 in further detail, according to aspects of the disclosure. As illustrated, the power switching logic may include a trip logic 402, a break logic 404, and a mode register 406. The trip logic 402 may include any suitable type of electronic circuitry, that is configured to: (i) detect a voltage on any of the vacant terminals 216 (FIG. 2), (ii) compare the detected voltage against a threshold voltage, and (iii) disconnect the volatile memory module 208 from the capacitor array 204 when the detected voltage exceeds the threshold voltage. The break logic 404 may include any suitable type of electronic circuitry that is configured to disconnect the capacitor array 204 from the volatile memory module 208 when the break line 314 is interrupted. It will be understood that the present disclosure is not limited to any specific implementation of the trip logic 402 and/or break logic 404.

Figure 5:
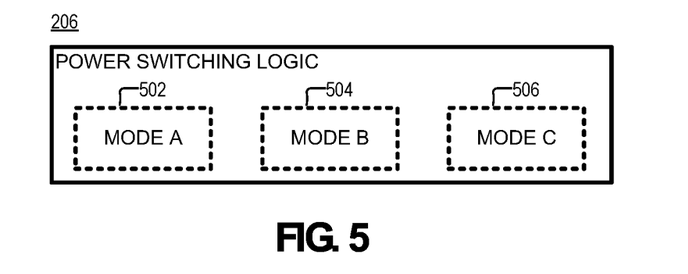
FIG. 5 is a diagram illustrating a plurality of operating modes of the power switching logic of FIG. 4.

The mode register 406 is arranged to store an indication of an operating mode of the power switching logic 206. As illustrated in FIG. 5, the power switching logic 206 may operate in one of at least a first operating mode 502, a second operating mode 504, and a third operating mode 506. When a first operating mode identifier is stored in the mode register 406, the power switching logic 206 may operate in a first operating mode 502. When a second operating mode identifier is stored in the mode register 406, the power switching logic 206 may operate in a second operating mode 504. And when a third operating mode identifier is stored in the mode register 406, the power switching logic 206 may operate in a third operating mode 506.

When the power switching logic 206 is operating in the first operating mode 502, the power switching logic 206 may: (i) monitor the voltage on any of the vacant terminals 216, (ii) detect whether the voltage one any of the terminals 216 exceeds a threshold, and (iii) disconnect the capacitor array 204 from the volatile memory module 208 when the voltage on any of the terminals 216 exceeds the threshold. In some respects, the voltage on any of the vacant terminals 216 may exceed the threshold when a signal analyzer (or another signal probe) is connected to the vacant terminals 216 in an attempt to break into the anti-tampering circuit 118 and retrieve the cryptographic key 119 from it. As noted above, disconnecting the capacitor array 204 from the volatile memory module 208 may cause the volatile memory module 208 to lose power and the cryptographic key 119 to be erased. In other words, when operating in the first operating mode, the power switching logic 206 may delete the cryptographic key 119 in response to detecting possible electronic tampering with the anti-tampering circuit 118.

When the power switching logic 206 is operating in the second operating mode 504, the power switching logic 206 may: (i) monitor the continuity of the break line 314, (ii) detect when the continuity of the break line is interrupted, and (iii) disconnect the capacitor array 204 from the volatile memory module 208 when the continuity of the break line 314 is interrupted. As noted above, in some implementations, the break line 314 may be interrupted when the integrity of a housing enclosure that contains the anti-tampering circuit 118 is violated (e.g., as a result of removing a panel of the enclosure, a as a result of cutting a hole into the enclosure, etc.). Furthermore, in some implementations, the break line 314 may be interrupted when the integrity of a package containing the anti-tampering circuit (e.g., a semiconductor package, a smart card package, etc.) is violated. In other words, when operating in the second operating mode 504, the power switching logic 206 may delete the cryptographic key 119 in response to detecting possible physical tampering with the anti-tampering circuit 118.

When operating in the third operating mode 506, the power switching logic 206 may (i) monitor the voltage on any of the vacant terminals 216, (ii) detect whether the voltage one any of the terminals 216 exceeds a threshold, and (iii) disconnect the capacitor array 204 from the volatile memory module 208 when the voltage on any of the terminals 216 exceeds the threshold. Furthermore, when operating in the third operating mode 506, the power switching logic 206 may (i) monitor the continuity of the break line 314, (ii) detect when the continuity of the break line is interrupted, and (iii) disconnect the capacitor array 204 from the volatile memory module when the continuity of the break line 314 is interrupted. In other words, when operating in the third operating mode 506, the power switching logic 206 may perform the operations that are associated each of the first operating mode 502 and the second operating mode 504.

Put differently, when operating in the third operating mode 506, the power switching logic 206 may delete the cryptographic key 119 from the volatile memory module 208 in response to: (i) detecting possible physical tampering with the anti-tampering circuit 118, and in response to: (ii) detecting possible electronic tampering with the anti-tampering circuit 118. By contrast, when operating in the first operating mode 502, the power switching logic 206 may not monitor the continuity of the break line, and it may erase the contents of the volatile memory module 208 only when possible electronic tampering with the anti-tampering circuit 118 is detected. Similarly, when operating in the second operating mode 504, the power switching logic 206 may not monitor the voltage on the vacant terminals 216, and it may erase the contents of the volatile memory module 208 only when possible electronic tampering with the anti-tampering circuit 118 is detected.

Although in the example of FIG. 4, a physical tampering event is detected in response to the break line 314 being interrupted, alternative implementations are possible in which the physical tampering event is detected in response to the break line becoming connected. In such implementations, the break line 314 may be become closed when the enclosure panel 302 is removed, and/or the integrity of a packaging of the anti-tampering circuit 118 is violated. More particularly, in such implementations, the break line may be provided with a switch that is switched off when the panel 302 is in place, and which becomes switched on when the panel 302 is removed from the enclosure 300. In other words, in some implementations, when the power switching logic 206 is operating in the first operating mode 502 and/or the third operating mode 506, the power switching logic 206 may disconnect the capacitor array 204 from the volatile memory module 208 in response to any suitable change of state of the break line 314. As used throughout the disclosure, the phrase "change of state of a break line" may refer to the break line 314 transitioning from a first state, in which current can flow from break terminal 310 to break terminal 312 to a second state, in which current cannot flow from break terminal 310 to break terminal 312. Alternatively, as used throughout the disclosure, the phrase "change of state of a break line" may refer to the break line 314 transitioning from a first state, in which current cannot flow from break terminal 310 to break terminal 312 to a second state, in which current can flow from break terminal 310 to break terminal 312.

Although in the example of FIG. 4, an electronic tampering event is detected in response to a voltage at any of the vacant terminals 216 exceeding a threshold, alternative implementations are possible in which an electronic tampering event is detected in response to the voltage at any of the terminals 218 and 220 exceeding a threshold. In such implementations, the power switching logic 206 may erase the contents of the volatile memory module 208 in response to a voltage at any of the terminals 216, 218, and/or 220 exceeding a threshold.

Figure 6:
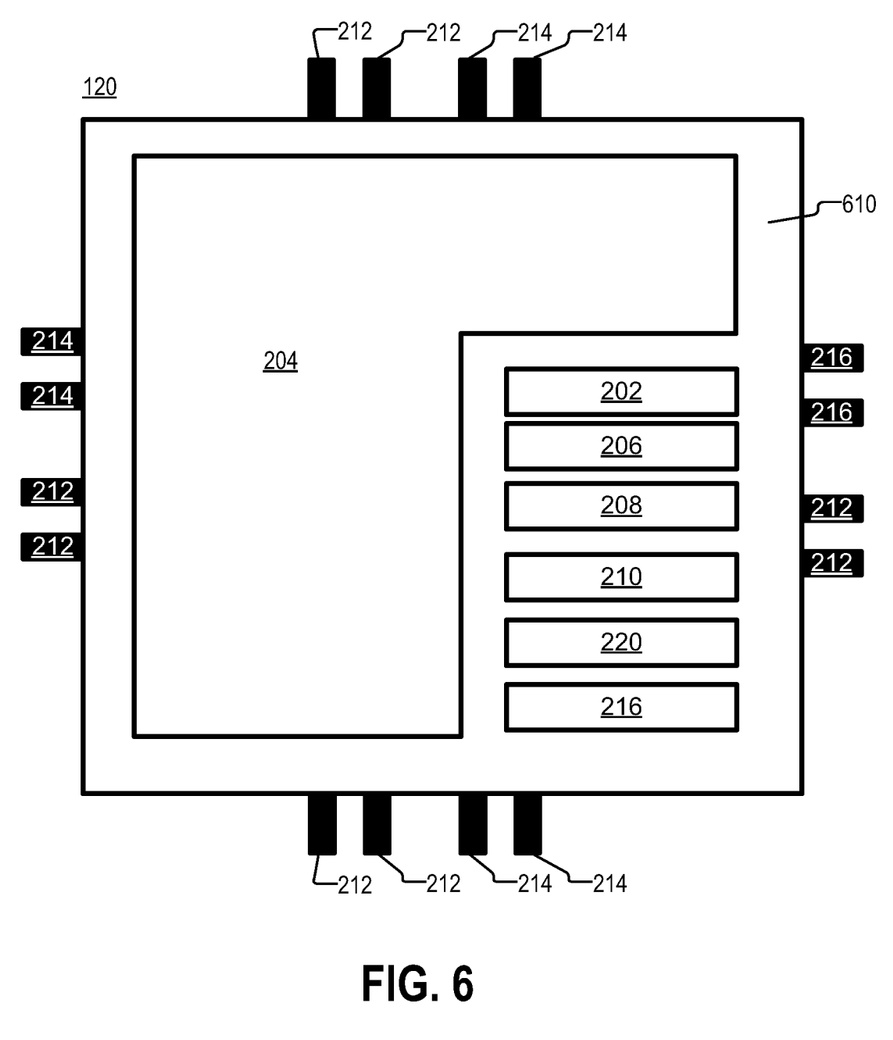
FIG. 6 is a diagram illustrating one possible configuration of the anti-tampering circuit of FIG. 2, according to aspects of the disclosure.

FIG. 6 shows the anti-tampering circuit 118 (of FIG. 1) in further detail. FIG. 6 illustrates that the anti-tampering circuit may be implemented as an integrated circuit in which the capacitor array 204, the power switching logic 206, the volatile memory module 208, the encryption block 210, and the control logic 212 are formed on the same die. Specifically, according to the example of FIG. 6, the capacitor array 204, the power switching logic 206, the volatile memory module 208, the encryption block 210, and the control logic 212 are implemented on a substrate 610. The substrate 610 may include a silicon substrate, a GaAs substrate, and/or any other suitable type of substrate. The capacitor array 204, the power switching logic 206, the volatile memory module 208, the encryption block 210, and the control logic 212 may be formed by using chemical vapor deposition (CVD) and/or any other suitable semiconductor manufacturing process. Although in the example of FIG. 6, the encryption block 210 and the control logic 212 are implemented on the same die as the capacitor array 204, the power switching logic 206, and the volatile memory module 208, alternative implementations are possible in which they are implemented separately.

In some implementations, the capacitor array 204 may occupy most of the space that is available on the substrate 610 (e.g., 70% or more), in order for the capacitor array 204 to be able to store an amount of power that is sufficient to retain the contents of the volatile memory module 208 during prolonged periods in which the host system 100 is turned off. In some respects, integrating the capacitor array 204 on the same die as the volatile memory module 208 and the power switching logic 206 is advantageous because it results in a compact anti-tampering device that does not require battery backup, or another secondary power source, to retain the contents of the volatile memory module 208 when the host system 100 is turned off. Furthermore, because the anti-tampering circuit 118 does not require battery backup, or another secondary power source, the anti-tampering circuit 118 may be easier to integrate, in various applications where tamper protection is desirable, than many conventional anti-tampering solutions.

Figure 7:
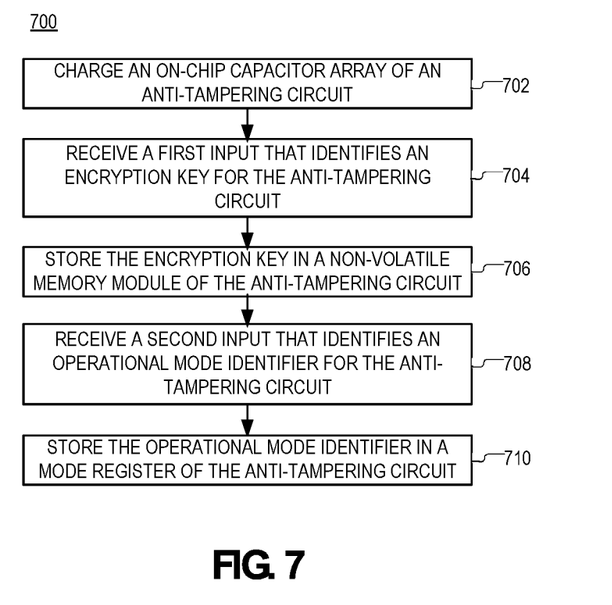
FIG. 7 is a flowchart of an example of a process, according to aspects of the disclosure.

FIG. 7 is a flowchart of a process 700 for configuring the anti-tampering circuit 118, according to aspects of the disclosure. In some implementations, the process 700 may be performed in the factory, before the anti-tampering circuit 118 is deployed in the host system 100. Additionally, or alternatively, in some implementations, the process 700A may be performed as part of the regular use of the anti-tampering circuit 118, after the anti-tampering circuit 118 is deployed in the host system 100.

At step 702, the capacitor array 204 is charged. At step 704, the control logic 212 receives a first input that identifies the cryptographic key 119. At step 706, the control logic 212 stores the cryptographic key 119 in the volatile memory module 208. At step 708, the control logic 212 receives a second input that identifies an operating mode for the power switching logic 206. At step 710, the control logic 212 stores, in the mode register 406, an operating mode identifier that corresponds to the identified operating mode, thereby transitioning the power switching logic 206 into the operating mode that is specified by the second input (e.g., into one of the operating modes 502, 504, and 506).

In some implementations, the first input may be received at the control logic 212 from the processor 112. Additionally, or alternatively, in some implementations, the first input may be received from a configuration device that is connected to the anti-tampering circuit 118 via one or more of the connection terminals 214. In some implementations, the second input may be received at the control logic 212 from the processor 112. Additionally, or alternatively, in some implementations, the second input may be received from a configuration device that is connected to the anti-tampering circuit 118 via one or more of the connection terminals 214. In some implementations, the second input may be received only when the anti-tampering circuit is being configured in the factory. Additionally, or alternatively, in some implementations, the second input may be received after the anti-tampering circuit 118 is deployed in the host system 100. In the latter case, the operating mode of the anti-tampering circuit 118 can be changed midway through the operation of the anti-tampering circuit 118, while the anti-tampering circuit 118 is already in use by the host system 100.

Figure 8A:
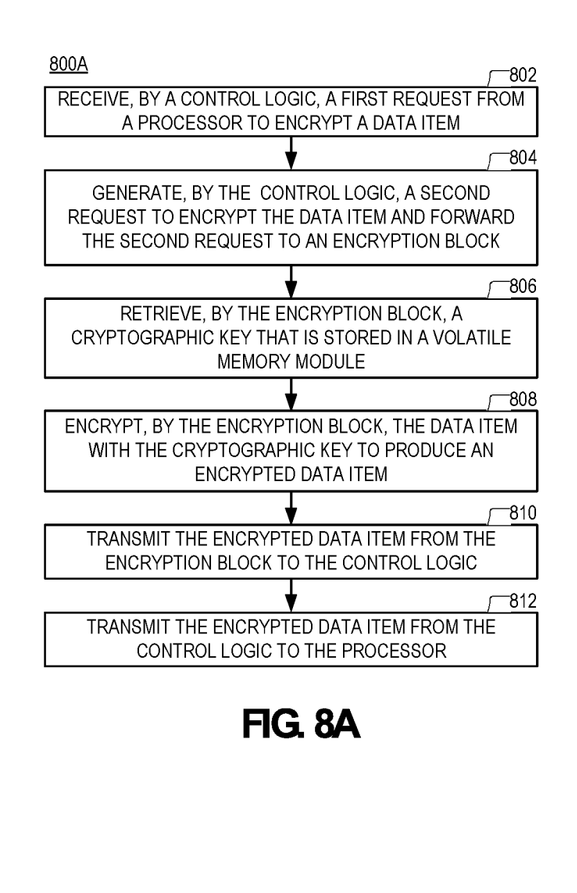
FIG. 8A is a flowchart of an example of a process, according to aspects of the disclosure.

FIG. 8A is a flowchart of a process 800A for operating the anti-tampering circuit 118, according to aspects of the disclosure. At step 802, the control logic 212 receives from the processor 112 a first request to encrypt a data item. At step 804, the control logic 212 generates a second request to encrypt the data item and forwards the second request to the encryption block 210. At step 806, the encryption block 210 retrieves the cryptographic key 119 from the volatile memory module 208. At step 808, the encryption block 210 encrypts the data item with the cryptographic key 119 to produce an encrypted data item. At step 810, the encryption block 210 transmits the encrypted data item to the control logic 212. At step 812, the control logic 212 transmits the encrypted data item to the processor 112.

Figure 8B:
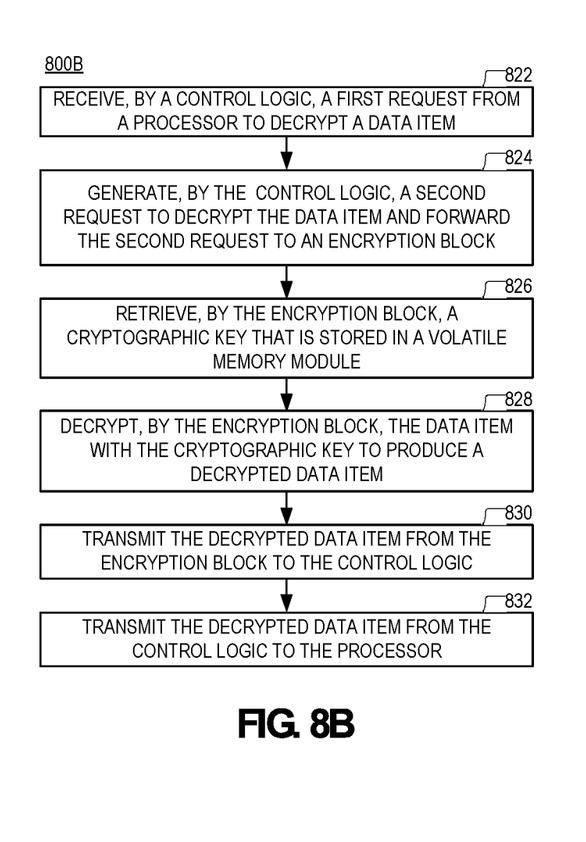
FIG. 8B is a flowchart of an example of a process, according to aspects of the disclosure.

FIG. 8B is a flowchart of a process 800B for operating the anti-tampering circuit 118, according to aspects of the disclosure. At step 822, the control logic 212 receives from the processor 112 a first request to decrypt a data item. At step 824, the control logic 212 generates a second request to decrypt the data item and forwards the second request to the encryption block 210. At step 826, the encryption block 210 retrieves the cryptographic key 119 from the volatile memory module 208. At step 828, the encryption block 210 decrypts the data item with the cryptographic key 119 to produce the decrypted data item. At step 830, the encryption block 210 transmits the decrypted data item to the control logic 212. At step 832, the control logic 212 transmits the decrypted data item to the processor 112.

Figure 9:
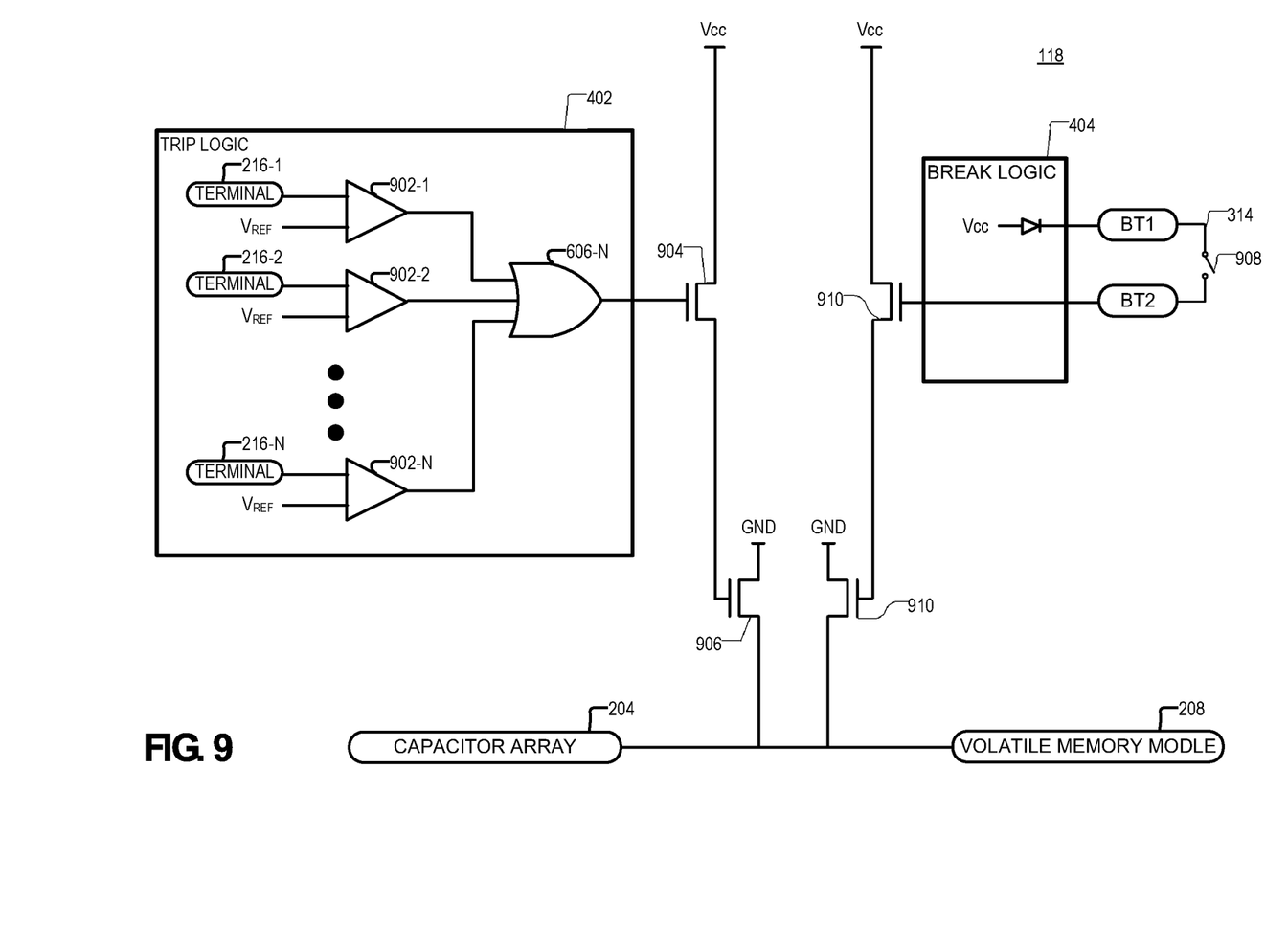
FIG. 9 is a diagram of an example of an anti-tampering circuit, according to aspects of the disclosure.

FIG. 9 is a schematic diagram illustrating an example of the anti-tampering circuit 118. Unlike the examples discussed with respect to FIGS. 1-8B, in the example of FIG. 9, the trip logic 402 and the break logic 404 are always active, causing the anti-tampering circuit 118 to operate in the third operating mode 506 only. In some respects, FIG. 9 is provided to illustrate one possible implementation of the trip logic 402 and/or the break logic 404.

In some implementations, the trip logic 402 may be implemented by using a plurality of voltage comparators 902. Each of the voltage comparators may be coupled to a different terminal 216 and to a reference voltage source. In operation, any of the voltage comparators 902 may compare the voltage on the comparator's respective terminal to the reference voltage, and switch on transistors 904 and 906 in response to the voltage at the comparator's respective terminal 216 exceeding the reference voltage. As can be readily appreciated, switching on transistors 904 and 906 may cause the volatile memory module 208 to be disconnected from the capacitor array 204, and the contents of the volatile memory module 208 to be deleted as a result.

In some implementations, the break logic 404 may be implemented by using a switch 908, which is arranged to close when a panel of the enclosure of the host system 100 is removed. The closing of switch 908 may cause transistors 910 and 912 to be switched on. As illustrated, switching on transistors 910 and 912 may cause the volatile memory module 208 to be disconnected from the capacitor array 204, and the contents of the volatile memory module 208 to be deleted as a result.

Although in the example of FIG. 9 only vacant terminals 216 are connected to voltage comparators 902, alternative implementations are possible in which any other connection terminal of the anti-tampering circuit 118 is connected to one of the voltage comparators 210. Although in the example of FIG. 9 a plurality of voltage comparators is used, alternative implementations are possible in which a single voltage comparator is used in combination with a switch that is configured to sequentially connect different terminals to the voltage comparator. In this regard, it will be understood that FIG. 9 is provided as an example only, and the present disclosure is not limited to the implementation of the trip logic 402 and/or the break logic 404, which is shown in FIG. 9.

FIGS. 1-9 are provided as an example only. At least some of the steps discussed with respect to FIGS. 1-9 may be performed in parallel, in a different order, or altogether omitted. As used in this application, the word "exemplary" is used herein to mean serving as an example, instance, or illustration. As used throughout the disclosure, the term "connected" means either "directly connected" or "indirectly connected." For example, two elements are directly connected when there are no other intervening elements present on an electrical path connect connecting the two elements. As another example, two elements are indirectly connected when there are other intervening elements present on an electrical path connecting the two elements.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. An integrated circuit having a plurality of connection terminals, comprising:
a volatile memory configured to store a cryptographic key;
a control circuitry;
an encryption block configured to retrieve the cryptographic key from the volatile memory, and decrypt data that is provided to the encryption block by the control circuitry;
a capacitor array for providing power to the volatile memory; and
a power switching circuitry arranged to connect and disconnect the volatile memory from the capacitor array, the power switching circuitry being arranged to operate in one of at least a first operating mode, a second operating mode, and a third operating mode,
wherein, when the power switching circuitry operates in the first operating mode, the power switching circuitry is configured to disconnect the capacitor array from the volatile memory in response to detecting a change of state of a break line, the break line extending between a pair of first terminals of the integrated circuit,
wherein, when the power switching circuitry operates in the second operating mode, the power switching circuitry is configured to disconnect the capacitor array from the volatile memory in response to detecting that a voltage at a second connection terminal of the integrated circuit exceeds a threshold,
wherein, when the power switching circuitry operates in the third operating mode, the power switching circuitry is configured to: (i) disconnect the capacitor array from the volatile memory in response to detecting a change of state of the break line, and (ii) disconnect the capacitor array from the volatile memory in response to detecting that the voltage at the second connection terminal of the integrated circuit exceeds the threshold, and
wherein the control circuitry is configured to receive an input specifying an operating mode for the power switching circuitry and transition the power switching circuitry into the specified operating mode, the specified operating mode including one of the first operating mode, the second operating mode, and the third operating mode.

2. The integrated circuit of claim 1, wherein disconnecting the capacitor array from the volatile memory causes the cryptographic key to be erased from the volatile memory.

3. The integrated circuit of claim 1, further comprising a voltage regulator that is configured to charge the capacitor array.

4. The integrated circuit of claim 1, wherein the volatile memory includes a static random-access memory (SRAM) module.

5. The integrated circuit of claim 1, wherein the power switching circuitry includes a mode register, and transitioning the power switching circuitry into the specified operating mode includes storing, in the mode register, an operating mode identifier that corresponds to the specified operating mode.

6. The integrated circuit of claim 1, wherein the capacitor array, the power switching circuitry, and the encryption block are formed on a substrate, and the second connection terminal is a vacant connection terminal.

7. A system, comprising:
a memory;
an anti-tampering circuit, including: (i) a volatile memory configured to store a cryptographic key; (ii) a control circuitry; (iii) a capacitor array for providing power to the volatile memory; (iv) a pair of first terminals, and (v) a power switching circuitry arranged to disconnect the capacitor array from the volatile memory in response to detecting a change of state of a break line, the break line extending between the pair of first terminals of the anti-tampering circuit, the break line being at least in part external to the anti-tampering circuit, the break line being configured to change states when a panel of an enclosure housing the system is removed; and
at least one processor that is operatively coupled to the memory and the anti-tampering circuit, wherein the at least one processor is configured to interact with the control circuitry of the anti-tampering circuit to decrypt data that is stored in the memory, the data being decrypted with the cryptographic key that is stored in the volatile memory of the anti-tampering circuit.

8. The system of claim 7, wherein disconnecting the capacitor array from the volatile memory causes the cryptographic key to be erased from the volatile memory.

9. The system of claim 7, further comprising a device enclosure housing the anti-tampering circuit, the at least one processor, and the memory, wherein the device enclosure is configured so that the state of the break line changes when a panel of the device enclosure is removed.

10. The system of claim 9, wherein removing the panel of the device enclosure causes the system to by cryptographically sanitized.

11. The system of claim 7, wherein the power switching circuitry is further configured to disconnect the capacitor array from the volatile memory when a voltage at a second connection terminal of the anti-tampering circuit exceeds a threshold.

12. The system of claim 7, wherein the anti-tampering circuit further includes a voltage regulator that is configured to charge the capacitor array.

13. The system of claim 7, wherein the volatile memory includes a static random-access memory (SRAM) module.

14. An integrated circuit, comprising:
a volatile memory configured to store a cryptographic key;
a control circuitry;
a capacitor array for providing power to the volatile memory; and
a power switching circuitry arranged to operate in at least a first operating mode, wherein, when the power switching circuitry operates in the first operating mode, the power switching circuitry is configured to disconnect the capacitor array from the volatile memory in response to detecting that a voltage at a data terminal of the integrated circuit exceeds a threshold, the data terminal being used by the control circuitry to send and receive data.

15. The integrated circuit of claim 14, wherein:
the power switching circuitry is further arranged to operate in one of at least the first operating mode, a second operating mode, and a third operating mode,
when the power switching circuitry operates in the second operating mode, the power switching circuitry is configured to disconnect the capacitor array from the volatile memory in response to detecting a change of state of a break line, and
when the power switching circuitry operates in the third operating mode, the power switching circuitry is configured to: (i) disconnect the capacitor array from the volatile memory in response to detecting a change of state of the break line, and (ii) disconnect the capacitor array from the volatile memory in response to detecting that the voltage at the data terminal exceeds the threshold.

16. The integrated circuit of claim 15, wherein the control circuitry is configured to receive an input specifying an operating mode for the power switching circuitry and transition the power switching circuitry into the specified operating mode, the specified operating mode including one of the first operating mode, the second operating mode, and the third operating mode.

17. The integrated circuit of claim 16, wherein the power switching circuitry includes a mode register, and transitioning the power switching circuitry into the specified operating mode includes storing, in the mode register, an operating mode identifier that corresponds to the specified operating mode.

18. The integrated circuit of claim 14, wherein disconnecting the capacitor array from the volatile memory causes the cryptographic key to be erased from the volatile memory.

19. The integrated circuit of claim 14, further comprising a voltage regulator that is configured to charge the capacitor array.

* * * * *